(12) United States Patent
Kim

(10) Patent No.: US 11,545,228 B2
(45) Date of Patent: Jan. 3, 2023

(54) OTP MEMORY AND STORAGE DEVICE INCLUDING THE SAME

(71) Applicant: Samsung Electronics Co., Ltd., Suwon-si (KR)

(72) Inventor: Hyung Seuk Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 17/145,636

(22) Filed: Jan. 11, 2021

(65) Prior Publication Data

US 2021/0366563 A1 Nov. 25, 2021

(30) Foreign Application Priority Data

May 20, 2020 (KR) .................. 10-2020-0060624

(51) Int. Cl.
| G11C 17/18 | (2006.01) |
| G11C 17/16 | (2006.01) |
| H04L 9/08  | (2006.01) |
| G06F 21/79 | (2013.01) |

(52) U.S. Cl.
CPC ......... *G11C 17/18* (2013.01); *G06F 21/79* (2013.01); *G11C 17/16* (2013.01); *H04L 9/0861* (2013.01); *H04L 9/0894* (2013.01)

(58) Field of Classification Search
CPC ......... G11C 17/18; G11C 17/16; G11C 7/12; G11C 8/08; G11C 7/24; G06F 21/79; G06F 21/78; G06F 21/80; G06F 3/0605; G06F 3/0679; H04L 9/0861; H04L 9/0894

See application file for complete search history.

(56) References Cited

U.S. PATENT DOCUMENTS

| 8,547,763 | B2 * | 10/2013 | Son ................. H01L 29/1045 365/185.01 |
| 8,610,140 | B2 | 12/2013 | Joo et al. |
| 10,218,503 | B2 | 2/2019 | Cope |
| 2007/0039060 | A1 * | 2/2007 | Jamieson ............ G06F 12/1433 726/34 |
| 2017/0366186 | A1 | 12/2017 | Reese |
| 2018/0019018 | A1 * | 1/2018 | Omid-Zohoor ........ G11C 17/18 |
| 2018/0349293 | A1 | 12/2018 | Lin |
| 2019/0018986 | A1 | 1/2019 | Choi et al. |
| 2019/0146930 | A1 | 5/2019 | Verhaeghe et al. |

FOREIGN PATENT DOCUMENTS

| KR | 100459206 B1 | 5/2005 |
| KR | 100907822 B1 | 7/2009 |
| KR | 101762918 B1 | 7/2017 |
| KR | 102059350 B1 | 12/2019 |

* cited by examiner

*Primary Examiner* — Jay W. Radke
(74) *Attorney, Agent, or Firm* — Muir Patent Law, PLLC

(57) ABSTRACT

A storage device may include a one time programmable (OTP) memory including a plurality of OTP cells and configured to store OTP key values in the plurality of OTP cells, and an erase instruction circuit that is detachably mounted on the storage device and connected to a first node of the OTP memory. When the erase instruction circuit is removed from the storage device, the OTP memory may be configured to receive the erase instruction signal having a first logic level at the first node and permanently erase all the OTP key values stored in the plurality of OTP cells by programming the plurality of OTP cells to an identical OTP key value in response to the erase instruction signal having the first logic level.

18 Claims, 23 Drawing Sheets

OTP MEMORY AND STORAGE DEVICE INCLUDING THE SAME

CROSS-REFERENCE TO RELATED APPLICATION

This application claims the benefit of Korean Patent Application No. 10-2020-0060624, filed on May 20, 2020, in the Korean Intellectual Property Office, the disclosure of which is incorporated herein in its entirety by reference.

BACKGROUND

The inventive concept relates to a one time programmable (OTP) memory, and more particularly, to a device that controls access to data stored in a memory by controlling signals input to an OTP cell array.

An OTP memory may store data in a plurality of OTP cells that may each have an unprogrammed state or a programmed state. An OTP cell does not lose programmed data even when a power source is cut off, and a programmed OTP cell cannot be reprogrammed, that is, irreversible. For example, an OTP cell may include a fuse or an antifuse, and may be electrically programmed. The OTP memory is used for storing information in various applications.

SUMMARY

The inventive concept provides a one time programmable (OTP) memory and an OTP memory control device to improve the security of data stored in a memory.

According to an aspect of the inventive concept, there is provided an OTP memory including an OTP cell array a plurality of OTP cells and configured to store OTP key values in the plurality of OTP cells arranged at intersections of a plurality of word lines and a plurality of bit lines, and a control circuit configured to receive an erase instruction signal at a first node and erase all the OTP key values by programming the plurality of OTP cells to an identical OTP key value of the OTP cell array in response to the erase instruction signal having a first logic level.

According to another aspect of the inventive concept, there is provided a storage device including an OTP memory including a plurality of OTP cells and configured to store OTP key values in the plurality of OTP cells, an erase instruction circuit that is detachably mounted on the storage device and connected to a first node of the OTP memory, and a controller configured to encrypt data stored in the storage device by using the OTP key values. When the erase instruction circuit is removed from the storage device, the OTP memory may be configured to receive an erase instruction signal having a first logic level at the first node and permanently erase all the OTP key values stored in the plurality of OTP cells by programming the plurality of OTP cells to an identical OTP key value in response to the erase instruction signal having the first logic level. When the erase instruction circuit is mounted on the storage device, the OTP memory may be configured to receive the erase instruction signal having a second logic level opposite the first logic level at the first node through the erase instruction circuit and program a target OTP cell of the plurality of OTP cells to an OTP key value in response to the erase instruction signal having the second logic level.

According to another aspect of the inventive concept, there is provided a storage device including an OTP memory including a plurality of OTP cells and configured to store OTP key values in the plurality of OTP cells, an erase instruction circuit that is detachably mounted on the storage device and connected to a first node of the OTP memory, and a nonvolatile memory configured to store data encrypted by using the OTP key values. When the erase instruction circuit is mounted on the storage device, the OTP memory may be configured to receive an erase instruction signal at the first node through the erase instruction circuit and permanently erase all the OTP key values by programming the plurality of OTP cells to an identical OTP key value in response to the erase instruction signal having a first logic level. When the erase instruction circuit is removed from the storage device, the OTP memory may be configured to receive the erase instruction signal having a second logic level opposite the first logic level at the first node and program a target OTP cell of the plurality of OTP cells to an OTP key value in response to the erase instruction signal having the second logic level.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
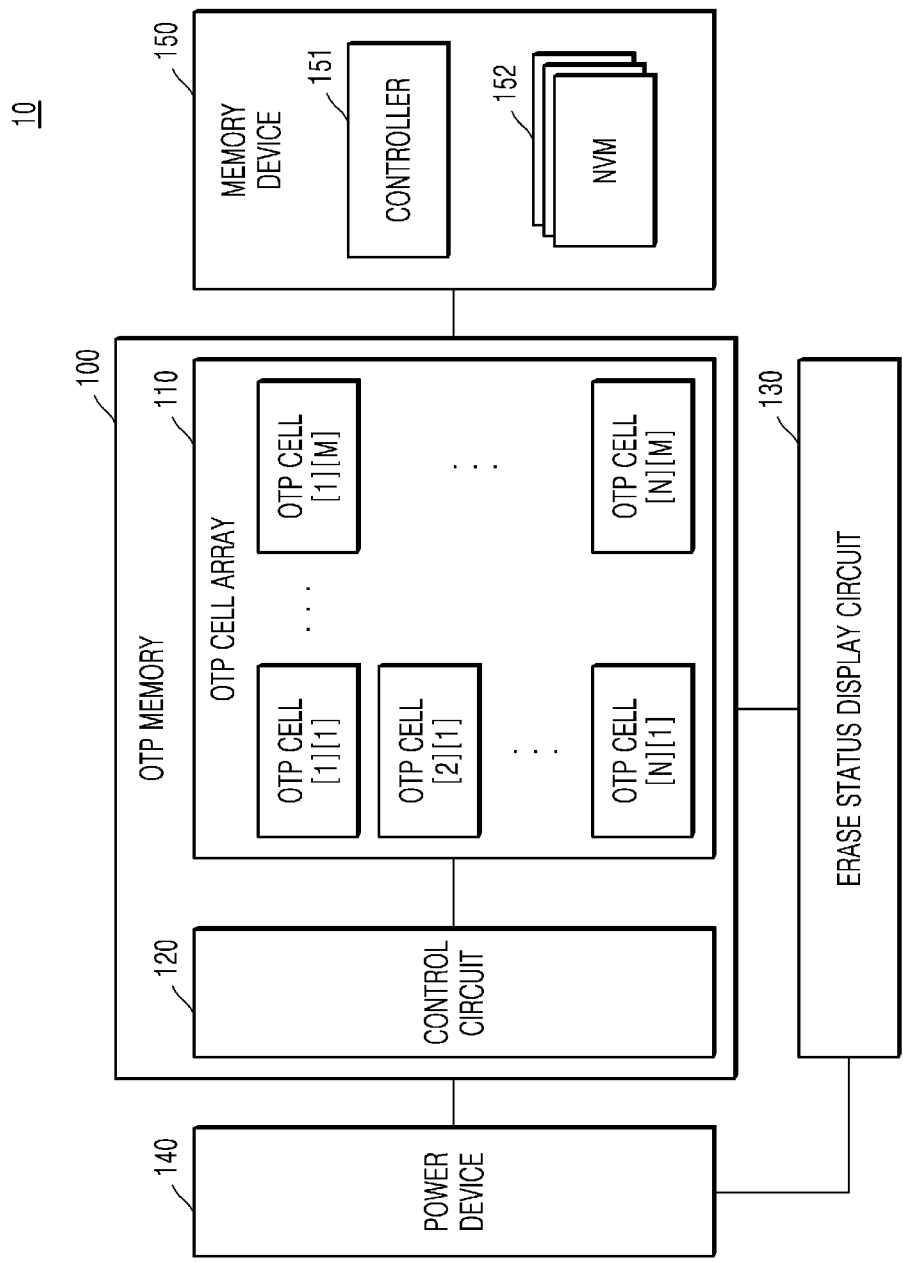
FIG. 1 is a block diagram of a one time programmable (OTP) memory according to an embodiment.

FIG. 1 is a block diagram schematically illustrating a storage device 10 including a one time programmable (OTP) memory 100 according to an embodiment.

The OTP memory 100 may be implemented and packaged as a single chip as an independent memory device, or may be implemented and packaged as a single chip (e.g., a system-on-chip (SoC)) together with other circuits, such as a memory and a processing core. In addition, the OTP memory 100 may be packaged by being embedded as one housing in a memory device 150 in which encrypted data is stored. That is, each component of the embodiment according to FIG. 1 is only classified according to a function, and a physical boundary is not limited thereto.

As shown in FIG. 1, the OTP memory 100 according to an embodiment may include an OTP cell array 110 and a control circuit 120, and may be connected to an external power device 140 and a memory device 150 in which encrypted data is stored. The OTP cell array 110 may include a plurality of OTP cells arranged in a plurality of rows and columns, and may at least temporarily store data '1' or data '0' as an OTP key value according to values of a bit line signal and a word line signal. For example, the OTP cell array 110 may include an array of M×N OTP cells corresponding to a first bit line to an $M^{th}$ bit line (M is a natural number of 2 or more) and a first word line to an $N^{th}$ word line (N is a natural number of 2 or more). For example, according to a signal applied to the first bit line and the first word line, an OTP cell corresponding to the first bit line and the first word line of the OTP cell array 110 may store data '0' or data '1'. However, storing a specific value in the OTP cell is not limited thereto, and when a certain value is input to the bit line and the word line to program a specific value in the OTP cell, the control circuit 120 may program a specific value into the OTP cell.

The control circuit 120 of the OTP memory 100 according to an embodiment may receive a signal related to a bit line signal and a word line signal and transmit the signal to the bit line and the word line of the OTP cell array 110. The control circuit 120 may include a logic gate that receives a plurality of signal values and outputs at least one of the bit line signal and the word line signal. For example, the control circuit 120 may include a logic gate that determines a value of at least one of the bit line signal and the word line signal according to an erase instruction signal indicating whether to erase an OTP key value of the OTP cell.

The storage device 10 according to an embodiment may further include an erase status display circuit 130 that displays whether all the OTP key values of the OTP cell array 110 have been erased. When OTP key values are not erased, the erase status display circuit 130 may be displayed in a first state. For example, when all the OTP key values are erased, the erase status display circuit 130 may be displayed in a second state opposite to the first state. For example, the first state may be a state in which a fuse exposed to the outside of a housing is connected, and the second state may be a state in which the fuse is disconnected or cut. However, the first state and the second state are not limited thereto, and when the erase instruction signal changes from a high logic level to a low logic level based on a reference value and a certain voltage is applied from the power device 140, a device capable of displaying that the OTP key values have been erased outside the housing may be included.

According to an embodiment, the OTP memory 100 may be connected to at least one of the power device 140 and the memory device 150. The power device 140 may supply power for operating the OTP memory 100. For example, the power device 140 may supply a power for continuously supplying an erase instruction signal to the OTP memory 100 and power for transmitting signals to a bit line and a word line of the OTP cell array 110. The power device 140 may continuously supply the OTP memory 100 with a high logic level signal as a power such that OTP key values stored in the OTP memory 100 are not erased and maintained.

A memory device 150 may include a controller 151 and a plurality of memory cells 152. The controller 151 may allocate memory cells for storing input data, and the plurality of memory cells 152 may store encrypted data. For example, the memory cells 152 may include volatile memory cells such as dynamic random access memory (DRAM), static RAM, mobile DRAM, double data rate synchronous DRAM (DDR SDRAM), low power DDR (LPDDR) SDRAM, graphic DDR (GDDR) SDRAM, or rambus DRAM (RDRAM). On the other hand, the memory cells 152 may be implemented as a nonvolatile memory such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), or ferroelectric random access memory (FRAM). Data stored in the memory cells 152 may be data encrypted by media encryption keys, and according to an embodiment, the media encryption keys may be embedded in the memory cells 152. In addition, because a media encryption key may be a key encrypted by First Key, which is the OTP key values stored in the OTP cell array 110, in order to read or program data stored in the memory device 150, the OTP key values need to be stored without being erased.

According to an embodiment, data stored in the memory cells 152 may be encrypted data based on the OTP key values, and may be encrypted through an encryption module included in the OTP memory 100. However, the encryption module is not limited thereto and is included in the memory device 150, so that the memory device 150 may encrypt data based on the OTP key values transmitted from the OTP cell array 110.

The storage device according to an embodiment may include a detachable erase instruction circuit, and when the erase instruction circuit is mounted, depending on a state programmed in the OTP cell array, the OTP memory may output an OTP value to encrypt and decrypt data, and OTP values of at least some cells may be changed when the erase instruction circuit is removed. For example, the OTP memory may set OTP values of all cells as identical values.

Figure 2:
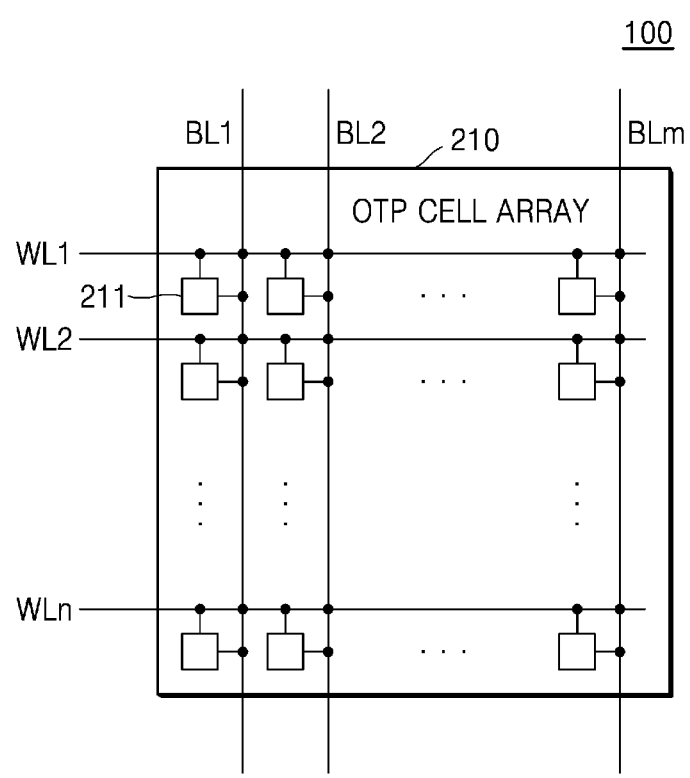
FIG. 2 is a view of an OTP cell array according to an embodiment.

FIG. 2 is a view of an OTP cell array 210 according to an embodiment.

The OTP cell array 210 may be implemented and packaged as one security chip as an independent memory device, or may be implemented and packaged as one chip together with other circuits, such as a memory or a processing core. The OTP cell array 210 may include a plurality of OTP cells arranged as a plurality of rows and columns. The plurality of OTP cells may be connected to a plurality of word lines WL1 to WLn and a plurality of bit lines BL1 to BLm, and may be arranged at intersections of the plurality of word lines WL1 to WLn and the plurality of bit lines BL1 to BLm. In FIG. 2, each of the plurality of word lines WL1 to WLn is illustrated as a single line, but in an embodiment, each of the plurality of word lines WL1 to WLn may include two or more lines connected to the same OTP cells 211. For example, two lines of a program word line and a read word line may be connected to one cell.

An OTP cell 211 may have an unprogrammed state or a programmed state, and programmed data may be determined according to the state of the OTP cell 211. For example, when a high current is applied to the OTP cell 211, a high resistance oxide film included in the OTP cell 211 is broken, and the OTP cell 211 in which the high resistance oxide film is broken may be read in a programmed state. Hereinafter, it is described that the OTP cell 211 has one program state, the unprogrammed OTP cell 211 stores a charge corresponding to data '0', and the programmed OTP cell 211 stores a charge corresponding to data '1'. However, it will be understood that the inventive concept is not limited thereto.

Figure 3:
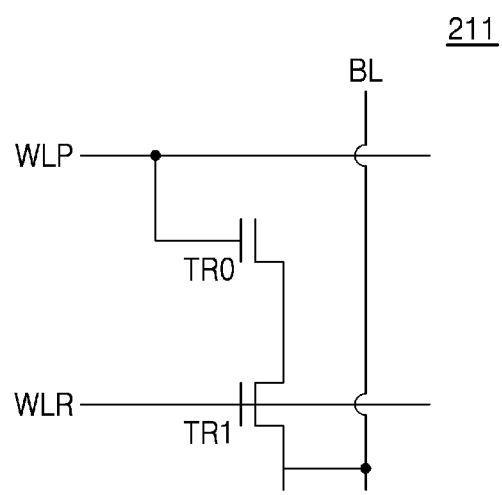
FIG. 3 is a circuit diagram of an OTP cell according to an embodiment.

FIG. 3 is a circuit diagram of the OTP cell 211 according to an embodiment.

An OTP cell array may include a plurality of OTP cells, OTP cells of the same row may share the same word line, and OTP cells of the same column may share the same bit line. However, the inventive concept is not limited thereto, and the OTP cells 211 of the same row may share a plurality of lines. As in the embodiment of FIG. 3, the OTP cells 211 of the same row may share an identical program word line WLP and an identical read word line WLR.

Referring to FIG. 3, the OTP cell 211 may include a program transistor TR0 and a read transistor TR1. The program transistor TR0 is a type of anti-fuse device and may change a conduction state according to a voltage difference between a gate and a source/drain of the program transistor TR0. The anti-fuse device is a structure capable of changing from a non-conducting state to a conducting state, and may change a high resistance state to a low resistance state in response to electrical stress such as a programming voltage or current. The programming voltage may be applied in the form of a pulse of several to tens of μs. Such an anti-fuse device may be simply implemented as a capacitor structure, or may be implemented as a transistor structure as in this embodiment.

The program word line WLP may be connected to the gate of the program transistor TR0. A first source/drain of the program transistor TR0 may be connected to a first source/drain of the read transistor TR1, and a second source/drain of the program transistor TR0 may be floated. A gate of the read transistor TR1 may be connected to the read word line WLR, and a second source/drain of the read transistor TR1 may be connected to a bit line BL. In a program operation, the read transistor TR1 performs a switching function, and when an operating voltage is applied to the gate of the read transistor TR1 through the read word line WLR, the read transistor TR1 may be turned on.

Before a program voltage through the program word line WLP is applied to the gate of the program transistor TR0, a high resistance state may be maintained between the gate and the first source/drain of the program transistor TR0 by a gate oxide film. In this case, in a read operation, certain voltages are applied to the gate of the program transistor TR0 and the bit line BL, respectively, and an operating voltage is applied to the gate of the read transistor TR1, a very small current or no current may flow through the bit line BL. In this case, the OTP cell 211 may store, for example, data '0'.

When a high voltage, that is, a program voltage, is applied to the gate of the program transistor TR0 through the program word line WLP, the gate oxide film of the program transistor TR0 may be broken down, so that a current path may be formed between the gate and the first source/drain of the program transistor TR0. Accordingly, the high resistance state between the gate and the first source/drain of the program transistor TR0 may transition to the low resistance state. As such, when the program transistor TR0 is in a low resistance state, in a read operation, the certain voltages are applied to the gate of the program transistor TR0 and the bit line BL, respectively, and the operating voltage is applied to the gate of the read transistor TR1, a current flowing through the bit line BL may be relatively large. For example, the program voltage applied to the gate of the program transistor TR0 in a program operation may be equal to or higher than the certain voltage applied to the gate of the program transistor TR0 in a read operation. When the program transistor TR0 is in a low resistance state, the OTP cell 211 may store, for example, data '1'.

Figure 4:
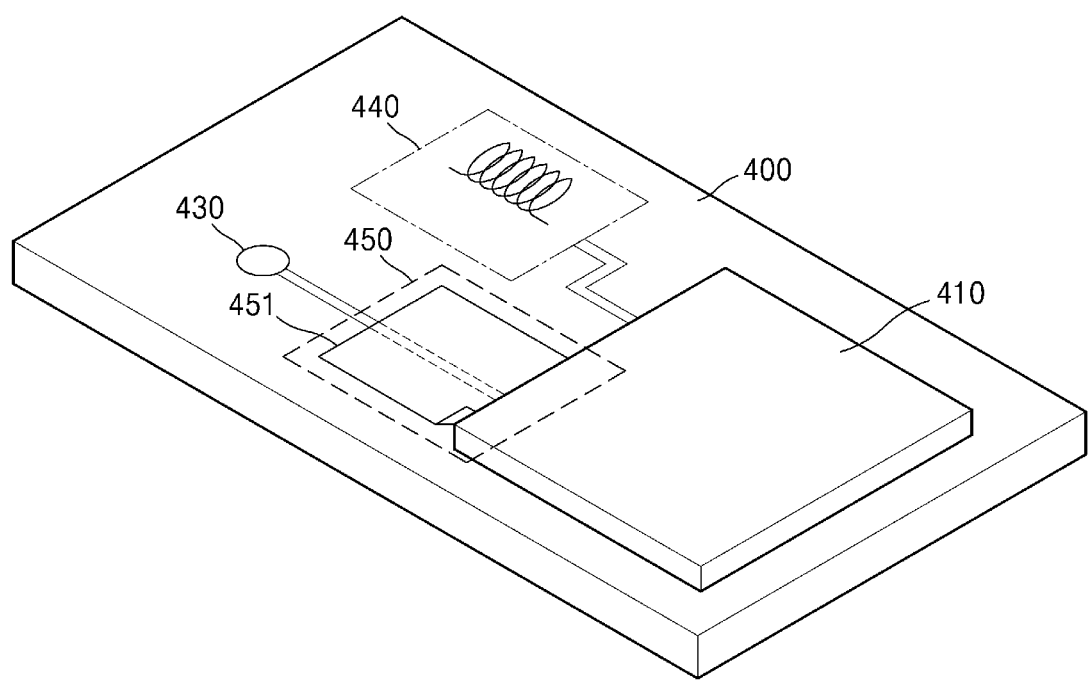
FIG. 4 is a view of a housing of a storage device to which a power source is connected to an OTP cell array, according to an embodiment.

FIG. 4 is a view of a housing of a storage device 400 to which a power source is connected to an OTP cell array, according to an embodiment.

According to the embodiment of FIG. 4, the storage device 400 may include a security chip 410, and the security chip 410 may include an OTP memory capable of programming and storing an OTP key value and reading the stored OTP key value. According to an embodiment, the security chip 410 may include an encryption module and may encrypt data based on the OTP key value stored in the OTP memory.

The storage device 400 may include a memory device and an OTP memory in which data encrypted in one package is stored, but is not limited thereto, and the memory device may be provided as a separate package from the storage device 400. When the memory device and the OTP memory are configured in separate packaging from the storage device 400, the storage device 400 may include a communicator capable of transmitting and receiving data in order to encrypt data to be stored in the memory device and to decrypt data stored in the memory device.

At least a portion of an erase instruction circuit 450 and an erase status display circuit 440 of the storage device 400 according to an embodiment may be exposed outside the housing of the storage device 400. The erase instruction circuit 450 may be detachably mounted on the storage device 400, and when the erase instruction circuit 450 is mounted, a power source 430 may be connected to the OTP memory to provide an erase instruction signal to the OTP memory. The erase instruction circuit is not shown outside the housing, but may further include a resistor for determining an erase instruction signal and a circuit line connected thereto according to an attaching and detaching state of the erase instruction circuit. Accordingly, even if an erase instruction circuit exposed outside the housing is removed, the configuration of resistors and circuit lines may remain in the storage device 400.

The erase instruction circuit 450 may include a switch, and turning the switch ON/OFF may be determined according to whether the erase instruction circuit 450 is attached or detached from the storage device 400. The switch according to an embodiment is configured to determine a current flow from the power source according to the attaching and detaching state of the erase instruction circuit, and may change the ON/OFF state once. For example, when the erase instruction circuit mounted on the storage device is removed, the erase instruction circuit cannot be mounted on the storage device again, and the switch of the erase instruction circuit may be changed from an ON state to an OFF state.

The switch of the erase instruction circuit 450 may determine whether to supply an erase instruction signal from the power source 430 to the security chip 410 according to an ON/OFF state. For example, when the switch is turned on, the power source 430 that supplies a power and a control circuit of the security chip 410 may be connected to each other, and the control circuit may receive an erase instruction signal having a high logic level. The switch may include an adhesive material 451, which is detachably attached to the outside of the housing by an external force, and a metal conducting wire. When the adhesive material 451 is adhered to the outside of the housing, because the metal conducting wire is located between the power source 430 and the control circuit, the erase instruction signal may be transmitted to the control circuit. For example, the adhesive material 451, such as a sticker or cellophane tape, may be configured to be detachably attached to the outside of the housing of the storage device 400, and the erase instruction circuit 450 may be coupled to the adhesive material 451 to be provided. When the erase instruction circuit 450 is attached to the housing of the storage device 400 together with the adhesive material 451, the erase instruction circuit 450 may be connected to the rest of the circuit, and because the power source 430 and the control circuit are conducted, the control circuit may receive an erase instruction signal having a high logic level. Although the detachable erase instruction circuit 450 has been described as a configuration attached to the adhesive material 451, the erase instruction circuit 450 is not limited thereto, and may include all embodiments in which the erase instruction circuit 450 is detachable to the housing of the storage device 400 and the state of conducting wire connection is controlled depending on whether or not the erase instruction circuit 450 is detached.

The erase status display circuit 440 according to an embodiment may receive a signal from the power source 430 that is connected to the erase instruction circuit and supplies a power. The erase status display circuit 440 may display whether OTP key values have been erased based on the signal received from the power source 430 that supplies a power. For example, when the erase status display circuit 440 is connected to the power source 430 that supplies a power and receives a high logic level signal, the erase status display circuit 440 may indicate that the OTP key values are not erased.

Figure 5:
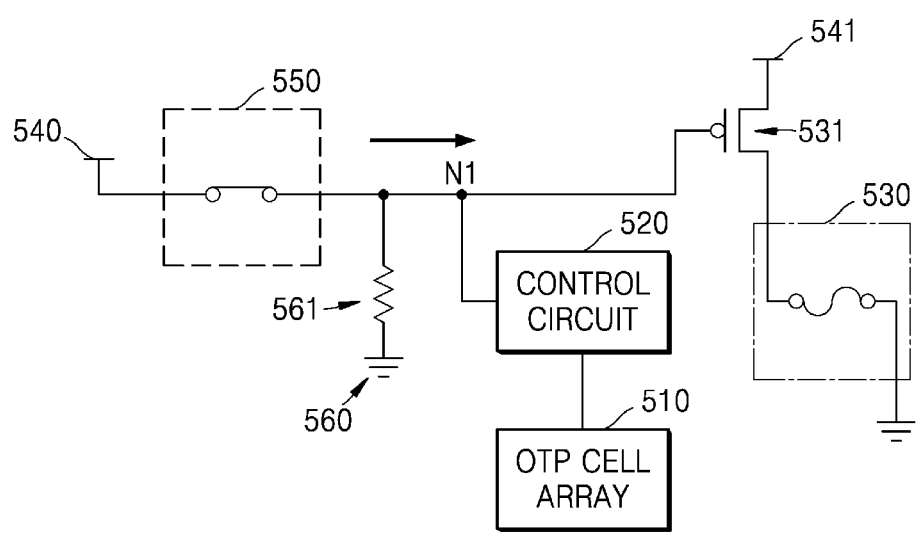
FIG. 5 is a circuit diagram in which a power source is connected to an OTP cell array, according to an embodiment.

FIG. 5 is a circuit diagram in which a first power source 540 is connected to an OTP cell array 510, according to an embodiment. The power source 540 may correspond to the power source 430 in FIG. 4.

The circuit diagram according to the embodiment of FIG. 5 shows a current flow of the storage device of FIG. 4, and may indicate that a switch 550 is turned on by mounting an erase instruction circuit outside the housing of the storage device.

The erase instruction circuit according to an embodiment may include the switch 550 connected between the first power source 540 and a first node N1 of the OTP memory.

According to the embodiment of FIG. 4, the switch 550 of the erase instruction circuit may be exposed to the outside of the storage device housing to determine an attaching or detaching state. The storage device 400 may include a resistor 561 connected between the first node N1 and a ground 560 and the resistor 561 may be arranged inside the housing. For example, the resistor 561 may be arranged between the switch and the security chip without being exposed, but is not limited thereto and may be included in the security chip. The erase instruction circuit according to an embodiment is expressed as the switch 550, but may refer to all configurations in which a connection state of a conducting wire is determined according to a user selection.

One end of the switch 550 may be connected to the first power source 540 that supplies a power to an OTP memory, and the other end of the switch 550 may be connected in parallel with the resistor 561, a control circuit 520, and an erase status display circuit. Accordingly, when the switch 550 is turned on (e.g., the switch 550 have been mounted on the storage device 400), the first power source 540 may transmit a signal having a high logic level to the control circuit 520 and the erase status display circuit. Hereinafter, a signal of the first node N1 may be referred to as an erase instruction signal. The control circuit 520 may transmit the erase instruction signal having a high logic level to the OTP cell array 510.

The erase status display circuit according to an embodiment may include a fuse 530 and a PMOS transistor 531 in which a gate is connected to an erase instruction circuit, a source is connected to a second power source 541, and a drain is connected to the fuse 530 exposed outside the housing of the storage device. Because the switch 550 of the erase instruction circuit is turned on and the erase instruction signal having a high logic level is input to the gate of the PMOS transistor 531, the PMOS transistor 531 is turned off, and no current flows through the fuse 530.

Figure 6:
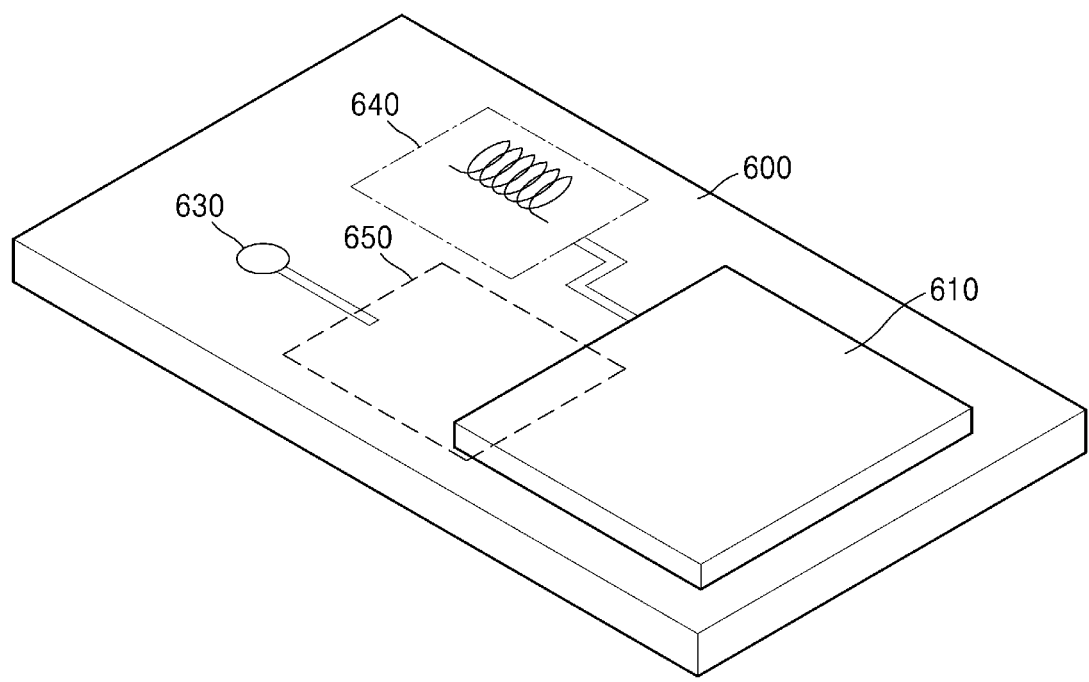
FIG. 6 is a view of a housing of a storage device in which a power source is disconnected from an OTP cell array, according to an embodiment.

FIG. 6 is a view of a housing of a storage device 600 in which a power source is disconnected from an OTP cell array, according to an embodiment.

An erase instruction circuit 650 detachably mounted on the storage device 600 may be removed from the storage device 600 by an external force, and when the erase instruction circuit 650 is removed, a security chip 610 including an OTP memory and an erase status display circuit 640 are disconnected from a power source 630, and thus the power source 630 cannot transmit an erase instruction signal to the security chip 610 and the erase status display circuit 640. For example, the erase instruction circuit 650 may include an adhesive material, which is detachably attached to the outside of the housing by an external force, and a metal conducting wire, and the metal conducting wire may be attached to the adhesive material. When a user removes the adhesive material to erase OTP key values, the metal conducting wire attached to the adhesive material is also removed from the housing of the storage device 600 and the erase instruction circuit 650 is disconnected, so that a control circuit and the erase status display circuit 640 cannot receive an erase instruction signal having a high logic level from the power source 630.

Figure 7:
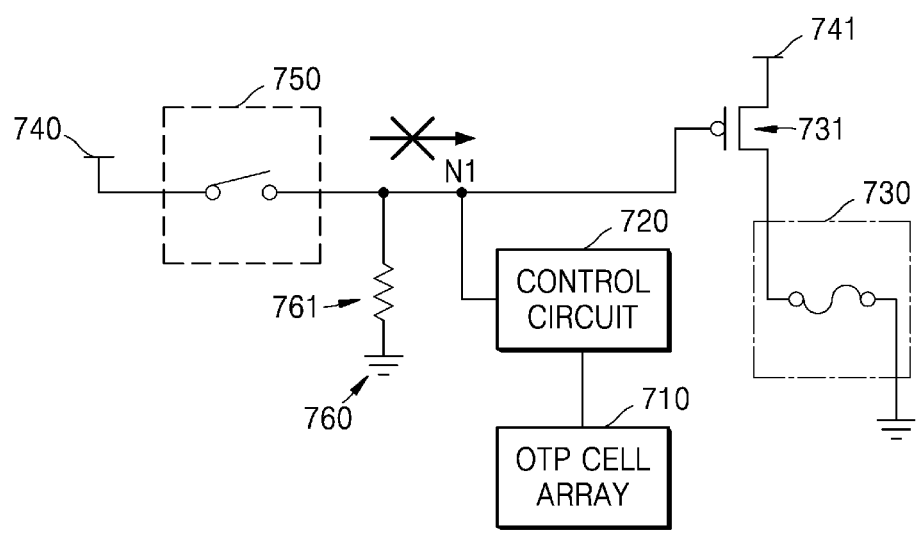
FIG. 7 is a circuit diagram in which a power source is disconnected from an OTP cell array, according to an embodiment.

FIG. 7 is a circuit diagram in which a first power source 740 is disconnected from an OTP cell array 710, according to an embodiment. The first power source 740 may correspond to the power source 630 in FIG. 6.

The circuit diagram according to the embodiment of FIG. 7 shows a current flow of the storage device 600 of FIG. 6, and may indicate that an erase instruction circuit is removed from the housing of the storage device and a switch 750 is turned off.

One end of the switch 750 may be connected to the first power source 740, and the other end of the switch 750 may be connected in parallel with a resistor 761 that is connected between the first node N1 of the OTP memory and a ground 760, a control circuit 720, and an erase status display circuit. Therefore, when the switch 750 is turned off (e.g., the switch 750 has been removed from the storage device 600), the first power source 740 cannot transmit an erase instruction signal having a high logic level to the first node N1, and because the control circuit 720 is connected in parallel with the resistor 761, the erase instruction signal input to the control circuit 720 has a low logic level. For example, the erase instruction signal input to the control circuit 720 may be determined by whether the erase instruction circuit is attached or detached. The control circuit 720 may transmit the erase instruction signal having a low logic level to the OTP cell array 710, program all OTP key values in the OTP cell array 710 to the same value and thus erase the OTP key values.

Because a PMOS transistor 731 of the erase status display circuit receives the erase instruction signal having a low logic level as a gate value, the PMOS transistor 731 is turned on and the state of a current flowing through a fuse 730 may be determined according to the state of a second power source 741 connected to a source of the PMOS transistor 731. For example, the fuse 730 may be cut or blown when the PMOS transistor 731 is turned on and a voltage level of the second power source 741 is equal to or greater than a threshold value.

The first power source 740 connected to the erase instruction circuit to supply a power to an OTP memory and the second power source 741 connected to the source of the PMOS transistor 731 may be the same power source, but may be different power sources. When the first power source 740 and the second power source 741 are configured with the same power source, a current may flow through the fuse 730 immediately when the PMOS transistor 731 is turned on. However, when the first power source 740 and the second power source 741 are configured as separate power sources, even if the PMOS transistor 731 is turned on, whether or not a current flows through the fuse 730 is determined according to the state of the second power source 741 connected to the source of the PMOS transistor 731. Accordingly, the state of the second power source 741 may be displayed outside the housing according to whether a current flows through the fuse exposed to the outside of the housing and the fuse is cut.

For example, when an erase instruction signal having a low logic level is input to the control circuit 720, the control circuit 720 may permanently erase OTP key values of the OTP cell array 710, and by cutting the fuse 730 of the erase state display circuit at the same time as erasing, the storage device may indicate that the OTP key values have been erased outside the housing.

Figure 8:
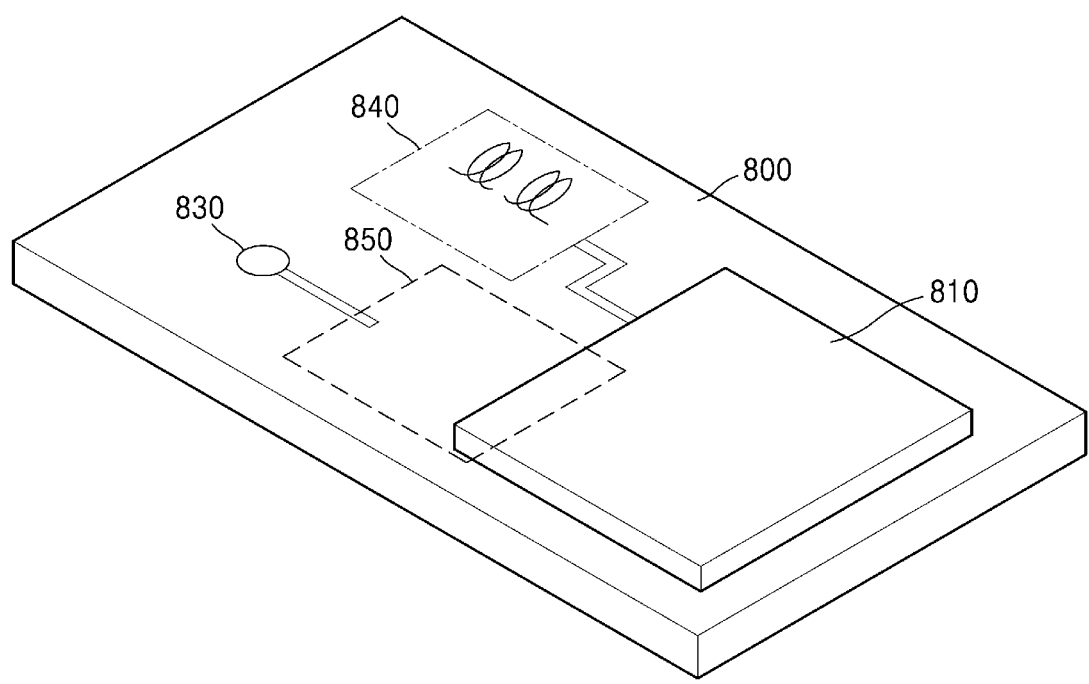
FIG. 8 is a view of a housing of a storage device in which OTP key values are displayed as erased, according to an embodiment.

FIG. 8 is a view of a housing of a storage device 800 in which OTP key values are displayed as erased, according to an embodiment.

According to the embodiment of FIG. 8, the storage device 800 may include a security chip 810, and the security chip 810 may include an OTP memory capable of programming and storing OTP key values and reading the stored OTP key values. According to an embodiment, the security chip 810 may include an encryption module and may encrypt data based on the OTP key values stored in the OTP memory.

When a second power source (e.g., 941 in FIG. 9) connected to an erase status display circuit 840 applies a current equal to or greater than a threshold current value to a fuse (e.g., 930 in FIG. 9) of the erase status display circuit 840 while an erase instruction circuit 850 is removed, the fuse of the erase status display circuit 840 may be cut or blown. Therefore, it can be confirmed in the housing of the storage device 800 that an erase instruction signal having a high logic level output from a power source 830 changes to an erase instruction signal having a low logic level in an OTP memory of a security chip 810 as the erase instruction circuit 850 is removed. Also, it can be seen that a signal equal to or greater than a threshold current value or a voltage value corresponding thereto is applied to the storage device 800 as the fuse of the erase status display circuit 840 of the erase status display circuit is cut or blown.

Figure 9:
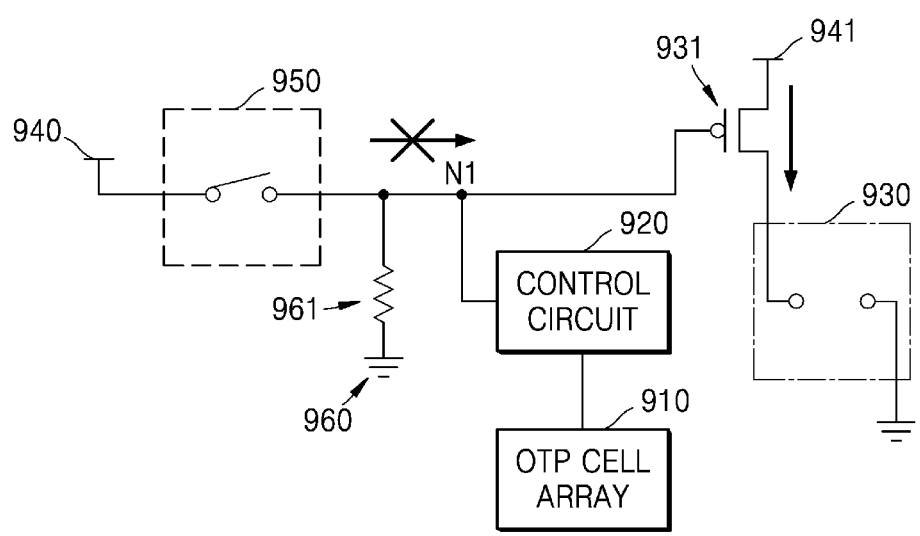
FIG. 9 is a circuit diagram in which OTP key values are displayed as erased, according to an embodiment.

FIG. 9 is a circuit diagram in which a first power source 940 is disconnected from an OTP cell array 910, and OTP key values of the OTP cell array 910 are displayed as erased, according to an embodiment. The first power source 940 may correspond to the power source 830 in FIG. 8.

The circuit diagram according to the embodiment of FIG. 9 is a diagram illustrating a current flow of the storage device of FIG. 8, and shows that a fuse 930 is blown by applying a current or voltage equal to or greater than a threshold value to the fuse 930 by a second power source 941.

As described in FIG. 9, when a switch 950 is turned off (e.g., the switch 950 has been removed from the storage device 800), a gate of PMOS transistor 931 of an erase status display circuit is connected to a ground 960 to receive an erase instruction signal having a low logic level. Therefore, the PMOS transistor 931 of the erase status display circuit may be in a turned-on state. In this case, when the erase status display circuit receives a voltage equal to or higher than a threshold voltage value from a second power source 941 connected to a source of the PMOS transistor 931, the current equal to or higher than a threshold current value is conducted to the fuse 930 and thus the fuse 930 may be cut or blown.

The second power source 941 according to an embodiment is connected to at least one of a control circuit 920 and the OTP cell array 910 with the erase status display circuit, and thus a signal applied to the OTP memory in order to erase OTP key values stored in OTP cells may be provided to at least one of the control circuit 920 and the OTP cell array 910 of the OTP memory. For example, the control circuit 920 may include a logic gate for generating a signal output to the OTP cell array 910, and the second power source 941 may be a power source for activating the logic gate. Here, when the second power source 941 supplies a power to the control circuit 920 to activate the logic gate of the control circuit 920 and an erase instruction signal of the first node N1 having a low logic level is input to the logic gate, the control circuit 920 may program all OTP key values stored in the OTP cell array 910 to the same value.

In FIGS. 6 to 9, according to an embodiment, a user may erase OTP key values by removing a portion of an erase instruction circuit outside the housing and supplying a power to an OTP memory from a second power source, thereby blocking access to encrypted data of a memory device based on the OTP key values. For example, when a power is on in the storage device, the OTP key values may be erased by removing the erase instruction circuit. In addition, when an erase instruction signal is changed from a high logic level to a low logic level, and a second power source applies a signal equal to or greater than a threshold current value or a voltage value corresponding thereto to an OTP memory, a storage device may indicate to the outside of a housing that the OTP key values has been erased. Accordingly, it is possible to disable the access of an unauthorized third party by disabling encrypted data to a memory device without any separate manipulation, and to recycle the memory device by not using the OTP memory. In addition, because information that the OTP key value has been erased may be visually confirmed without additional equipment, the security of data may be further improved.

FIGS. 10 to 15 are views illustrating a housing and a circuit diagram of a storage device 1000, according to example embodiments.

FIGS. 6 to 9 may be example embodiments of a storage device that erases OTP key values of an OTP cell array as at least a portion of an erase instruction circuit is removed, and FIGS. 12 to 15 may be example embodiments of a storage device that erases OTP key values of an OTP cell array as at least a portion of an erase instruction circuit is mounted.

Figure 10:
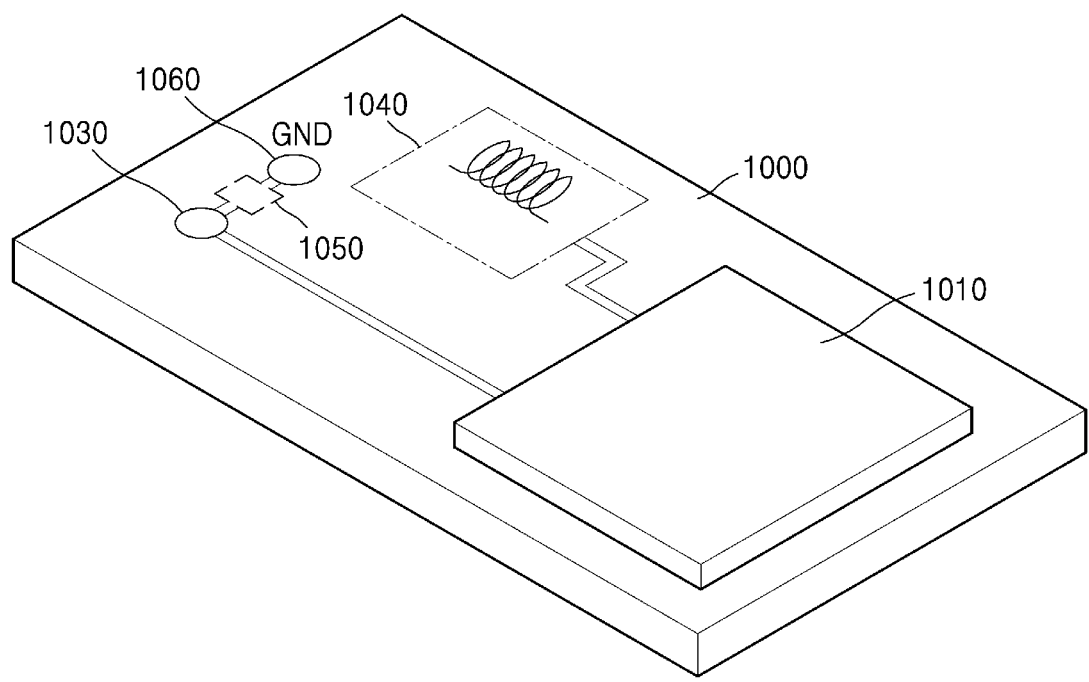
FIGS. 10 to 15 are views illustrating a housing and a circuit diagram of a storage device, according to example embodiments.

FIG. 10 is a diagram illustrating a housing of a storage device 1000 in which a power source 1030 and an OTP cell array are connected to each other, according to an embodiment.

An erase instruction circuit 1050 of the storage device 1000 may be exposed outside the housing of the storage device 1000, and at least a portion of the erase instruction circuit 1050 may be detachably mounted on the storage device 1000. When the at least a portion of the erase instruction circuit 1050 is removed from the storage device 1000, a conducting wire may be disconnected between the power source 1030 and a ground 1060, and the power source 1030 may provide an erase instruction signal having a high logic level to a security chip 1010 and an erase status display circuit by a conducting wire connected from the power source 1030 to the security chip 1010 and the erase status display circuit.

For example, the at least a portion of the erase instruction circuit 1050 may include a metal conducting wire attached to an adhesive material, and when the adhesive material is separated from the outside of the housing, the metal conducting wire may be removed. However, the configuration of the at least a portion of the erase instruction circuit 1050 is not limited thereto, and may include any configuration that the metal conducting wire of the erase instruction circuit can be detachably attached to the storage device 1000. The configuration of the security chip 1010 and an erase status display circuit 1040 according to an embodiment have been described above in the embodiment of FIG. 4, and thus a detailed description thereof will not be given herein.

Figure 11:
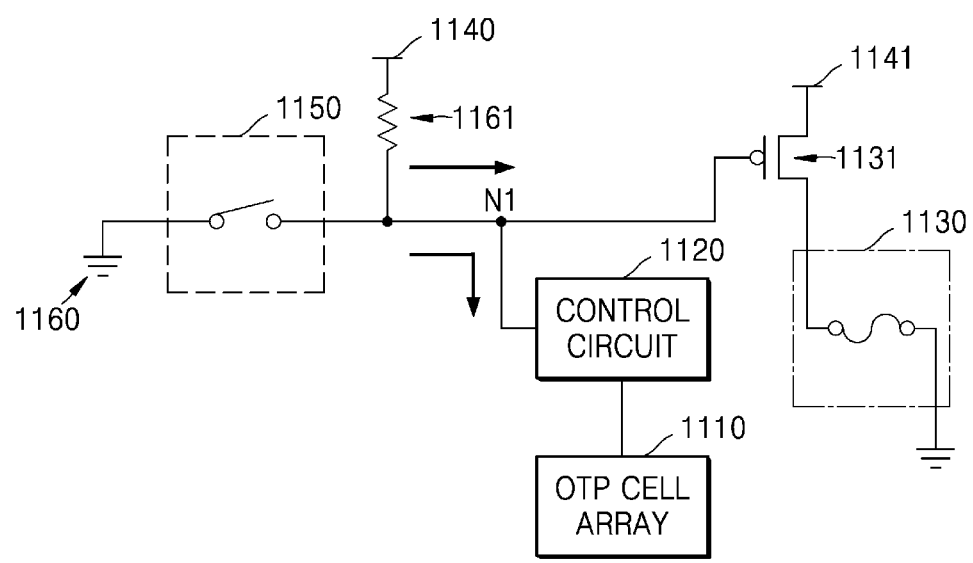

FIG. 11 is a circuit diagram in which a power source and an OTP cell array 1110 are connected to each other, according to an embodiment.

The circuit diagram according to the embodiment of FIG. 11 shows a current flow of the storage device of FIG. 10, and may indicate that at least a portion of an erase instruction circuit is removed from the housing of the storage device and a switch is turned off.

The erase instruction circuit according to an embodiment may include a switch 1150 connected between a ground 1160 and the first node N1 of the OTP memory. The storage device 1000 may include a resistor 1161 connected between a first power source 1140 supplying a power to a control circuit 1120 and an OTP cell array 1110 of an OTP memory through the first node N1. The first power source 1140 may correspond to the power source 1030 in FIG. 10. One end of the switch 1150 may be connected to a ground 1160, and the other end of the switch 1150 may be connected in parallel with a resistor 1161, the control circuit 1120, and an erase status display circuit (e.g., a fuse 1130 and a PMOS transistor 1131). Accordingly, when the switch 1150 is turned off (e.g., the switch 1150 has been removed from the storage device 1000), the first power source 1140 may transmit an erase instruction signal having a high logic level to the control circuit 1120 and the erase status display circuit through the first node N1 of the OTP memory. The control circuit 1120 receiving the erase instruction signal having a high logic level may transmit a signal output thereby to the OTP cell array 1110.

The erase status display circuit according to an embodiment may include the PMOS transistor 1131 in which a gate is connected to an erase instruction circuit, a source is connected to a second power source 1141, and a drain is connected to the fuse 1130 exposed outside the housing of the storage device. Because the switch 1150 of the erase instruction circuit is turned off and the erase instruction signal having a high logic level is input to the gate of the PMOS transistor 1141, the PMOS transistor 1141 is turned off, and no current flows through the fuse 1130.

Figure 12:
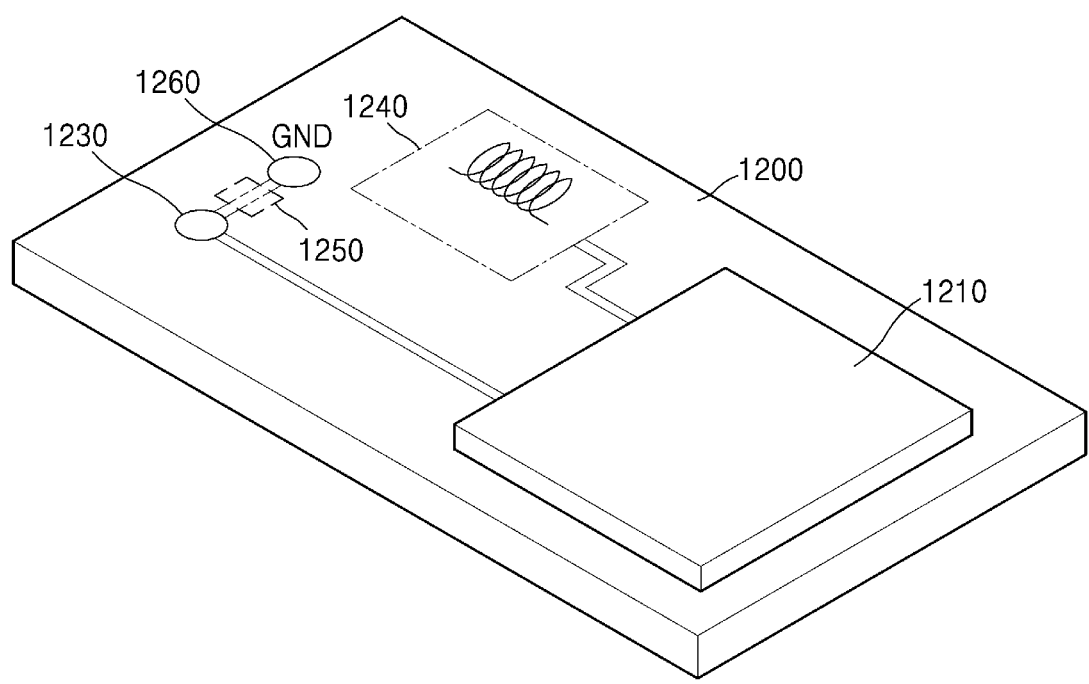

FIG. 12 is a view of a housing of a storage device 1200 to which a power source 1230 is connected to a ground 1260, according to an embodiment.

At least a portion of an erase instruction circuit 1250 detachably mounted on a storage device 1200 may be mounted on the storage device 1200. When the at least a portion of the erase instruction circuit 1250 is mounted in the storage device 1200, the power source 1230 is connected to the ground 1260 of no load, so that most of currents flow to the ground 1260, and because a security chip 1210 including an OTP memory and an erase status display circuit 1240 are connected to the ground 1260, the power source 1230 cannot transmit an erase instruction signal having a high logic level to the security chip 1210 and the erase status display circuit 1240. For example, the erase instruction circuit 1250 may include an adhesive material, which is detachably attached to the outside of the housing by an external force, and a metal conducting wire. The metal conducting wire may be attached to the adhesive material. When a user attaches the adhesive material to erase an OTP key value, the metal conducting wire attached to the adhesive material conducts between the power source 1230 and the ground 1260, so that the OTP memory of the security chip 1210 and the erase status display circuit 1240 cannot receive the erase instruction signal having a high logic level from the power source 1230, and have an erase instruction signal having the same level as the ground 1260.

Figure 13:
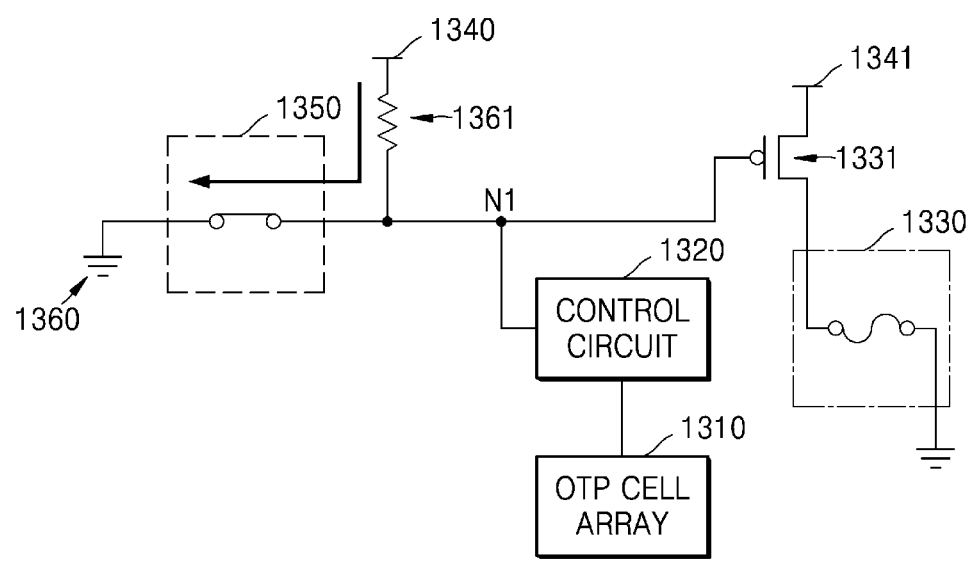

FIG. 13 is a circuit diagram in which a power source and a ground are connected to each other, according to an embodiment.

The circuit diagram according to the embodiment of FIG. 13 shows a current flow of the storage device 1200 of FIG. 12, wherein an erase instruction circuit is mounted on the housing of the storage device and thus a switch 1350 is turned on.

One end of the switch 1350 may be connected to a ground 1360, and the other end of the switch 1350 may be connected in parallel with a resistor 1361, a control circuit 1320, and an erase status display circuit. Therefore, when the switch 1350 is turned on (e.g., the switch 1350 has been mounted on the storage device 1200), a first power source 1340 cannot transmit the erase instruction signal having a high logic level to the first node N1, the control circuit 1320, and the erase status display circuit, and because the control circuit 1320 is connected in parallel with the ground 1360, the erase instruction signal input to the control circuit 1320 has a low logic level. For example, the erase instruction signal input to the control circuit 1320 may be determined by whether the erase instruction circuit is attached or detached. The control circuit 1320 receiving the erase instruction signal having a low logic level, by transmitting a signal output thereby to the OTP cell array 1310, may program all OTP key values stored in the OTP cell array 1310 to the same value and then erase the OTP key values. Herein, the first power source 1340 may correspond to the power source 1230 in FIG. 12.

Because a PMOS transistor 1331 of the erase status display circuit receives the erase instruction signal having a low logic level as a gate value, the PMOS transistor 1331 is turned on and the state of a current flowing through a fuse 1330 may be determined according to the state of a second power source 1341 connected to a source of the PMOS transistor 1331.

The first power source 1340 connected to the erase instruction circuit to supply a power to the OTP memory and the second power source 1341 connected to the source of the PMOS transistor 1331 of the erase status display circuit may be the same power source, but may be different power sources. When the first power source 1340 and the second power source 1341 are configured with the same power source, a current may flow through the fuse 1330 immediately when the PMOS transistor 1331 is turned on. However, when the first power source 1340 and the second power source 1341 are configured as separate power sources, even if the PMOS transistor 1331 is turned on, whether or not a current flows through the fuse 1330 is determined according to a state of the second power source 1341, and thus the state of the second power source 1341 may also be checked outside the housing according to whether or not a current flows through the fuse 1330.

For example, when an erase instruction signal that changed from high logic level to low logic level is input to the control circuit 1320, the control circuit 1320 may permanently erase the OTP key values of the OTP cell array 1310, and by cutting the fuse 1330 of the erase status display circuit at the same time, the storage device 1200 may indicate that the OTP key values have been erased outside the housing.

Figure 14:
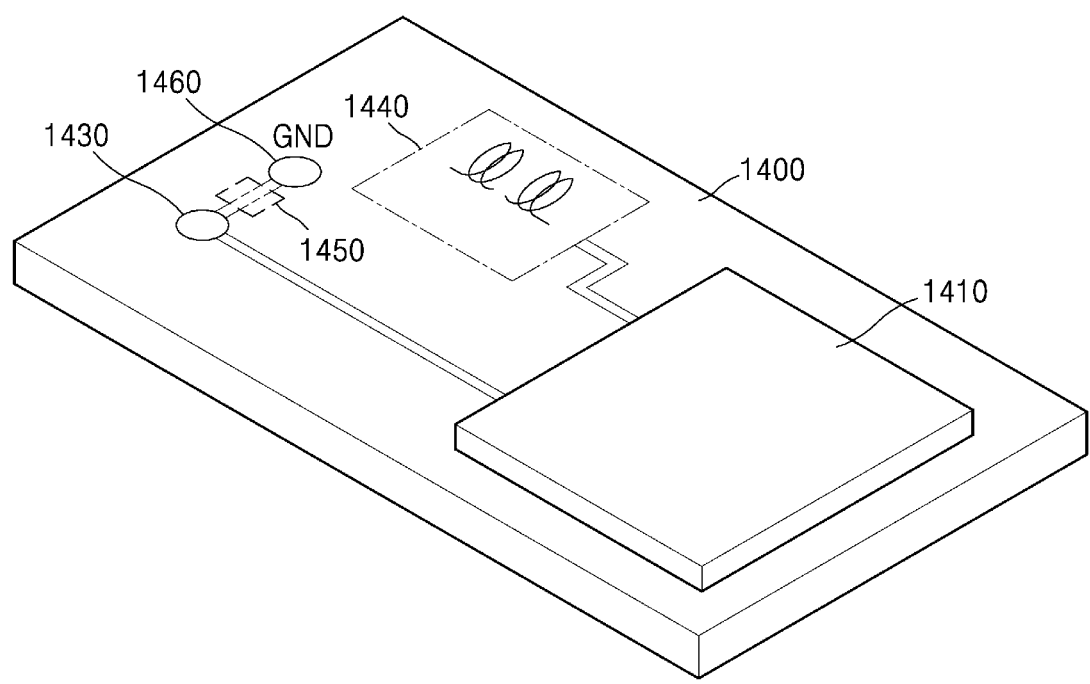

FIG. 14 is a view of a housing of a storage device 1400 in which OTP key values are displayed as erased, according to an embodiment.

When a second power source connected to an erase status display circuit applies a current equal to or greater than a threshold current value to a fuse 1440 while an erase instruction circuit 1450 is mounted, the fuse 1440 may be disconnected. Therefore, it can be confirmed in the housing of the storage device 1400 that a high logic level erase instruction signal output from a power source 1430 changes to a low logic level erase instruction signal in an OTP memory 1410 as the erase instruction circuit 1450 is mounted. Also, it can be seen that the second power source applies a signal equal to or greater than the threshold current value or a voltage value corresponding thereto to the storage device 1400 as the fuse 1440 of the erase status display circuit is disconnected.

Figure 15:
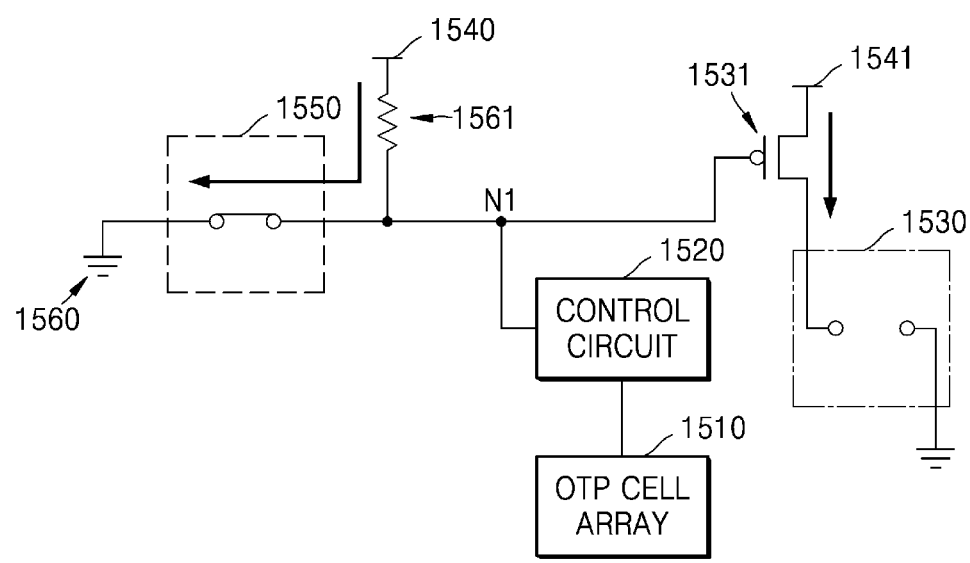

FIG. 15 is a circuit diagram in which OTP key values are displayed as erased, according to an embodiment.

The circuit diagram according to the embodiment of FIG. 15 is a diagram illustrating a current flow of the storage device of FIG. 14, and shows that a fuse 1530 is cut by applying a current equal to or greater than a threshold current value to the fuse 1530 by a second power source 1541.

As described in FIG. 13, when a switch 1550 is turned on (e.g., the switch 1550 has been mounted on the storage device 1400), a gate of PMOS transistor 1531 of an erase status display circuit is connected to a ground 1560 to receive a signal having a low logic level through the first node N1 of the OTP memory. Therefore, the PMOS transistor 1531 may be in a turned-on state. In this case, when the erase status display circuit receives a voltage equal to or higher than a threshold voltage value from the second power source 1541 connected to a source of the PMOS transistor 1531, a current equal to or higher than the threshold current value may be conducted to the fuse 1530 and thus the fuse 1530 may be cut.

The second power source 1541 according to an embodiment is connected to at least one of a control circuit 1520 and an OTP cell array 1510 of an OTP memory together with the erase status display circuit, and thus a signal to be applied in order to erase OTP key values stored in OTP cells may be provided to at least one of the control circuit 1520 and the OTP cell array 1510 of the OTP memory. For example, the control circuit 1520 may include a logic gate for generating a signal output to the OTP cell array 1510, and the second power source 1541 may be a power source for activating the logic gate. Here, when a logic gate of the control circuit 1520 is activated and a logic row erase instruction signal is input to the logic gate, the control circuit 1520 may program the OTP cell array 1510 in which all OTP key values have been stored to the same value.

Figure 16:
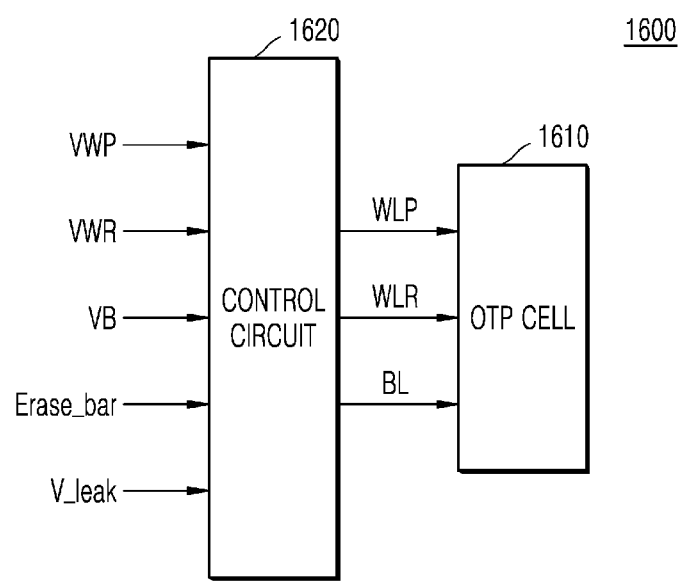
FIG. 16 is an OTP memory illustrating input/output of a control signal for programming an OTP key value, according to an embodiment.

FIG. 16 is an OTP memory illustrating input/output of a control signal for programming an OTP key value, according to an embodiment.

An OTP memory 1600 according to an embodiment may receive a plurality of signals and store an OTP key value in an OTP cell 1610. A control circuit 1620 detects a change in an erase instruction signal Erase_bar, and may program a specific key value in the OTP cell 1610 by providing a specific value to the OTP cell 1610 when the erase instruction signal Erase_bar changes.

The input/output of the control signal according to the embodiment of FIG. 16 may be an embodiment for programming a specific value in the OTP cell. The control circuit 1620 may receive a second signal VWP associated with a program word line, a third signal VB associated with a bit line, and a fourth signal VWR associated with a read word line, and may receive an erase instruction signal Erase_bar determined to be a high logic level or a low logic level according to a connection state with a power source that supplies a power to a storage device.

The control circuit 1620 according to an embodiment may output a program word line signal WLP based on the second signal VWP and the erase instruction signal Erase_bar, may output a bit line signal BL based on the third signal VB and the erase instruction signal Erase_bar, and may output a read word line signal WLR based on the fourth signal VWR and the erase instruction signal Erase_bar. According to an embodiment, the control circuit 1620 may output the bit line signal BL based on the third signal VB, the erase instruction signal Erase_bar, and a leak signal (V leak).

The control circuit 1620 may include a logic gate that receives two signals and outputs one signal. For example, the control circuit 1620 may output signals of a program word line, a read word line, and a bit line in response to input of the erase instruction signal Erase_bar and one of the second signal VWP, the third signal VB, and the fourth signal VWR to a NAND GATE. The output of the program word line signal WLP, the read word line signal WLR, and the bit line signal BL by the control circuit 1620 during the program and erase processes will be described later in detail with reference to FIGS. 18 to 22.

Figure 17:
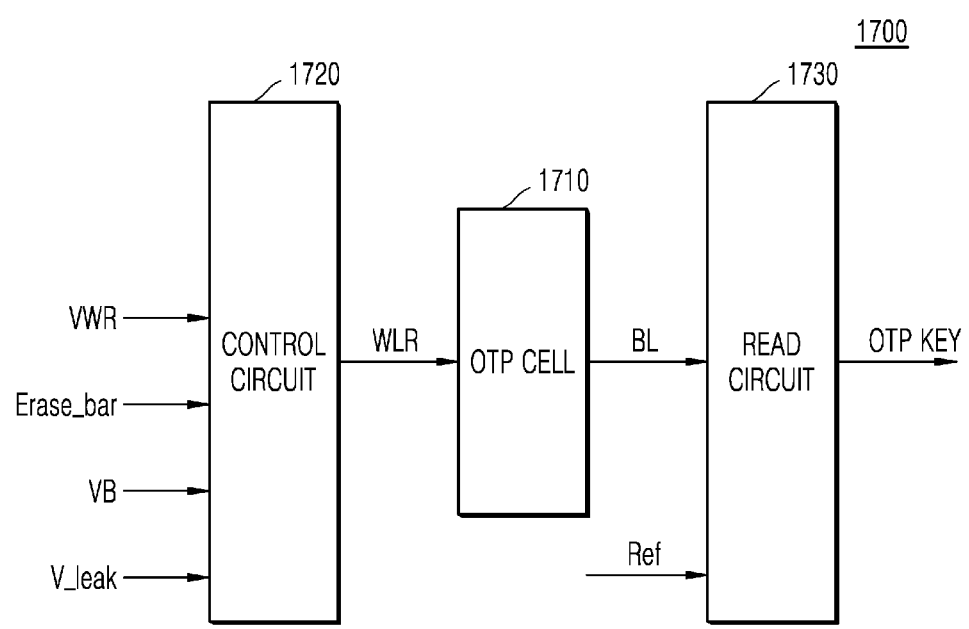
FIG. 17 is an OTP memory illustrating input/output of a control signal for reading an OTP key value, according to an embodiment.

FIG. 17 is an OTP memory illustrating input/output of a control signal for reading an OTP key value, according to an embodiment.

An OTP memory 1700 according to an embodiment may further include a read circuit 1730 for reading an OTP key value stored in an OTP cell 1710 during a read operation. The read circuit 1730 may be provided in a hardware configuration separate from a control circuit 1720 and the OTP cell 1710, but is not limited thereto, and may share a bit line with the control circuit 1720 and the OTP cell 1710 in one circuit packaging.

During the read operation, the control circuit 1720 may receive a second signal VWP, a third signal VB, a fourth signal VWR, a leak signal V_leak and an erase instruction signal Erase_bar. The control circuit 1720 may output the read word line signal WLR for reading the OTP key value stored in the OTP cell 1710 based on the second, third, and fourth signal VWP, VB, and VWR, a leak signal V_leak and the erase instruction signal Erase_bar. When receiving the program word line signal WLP, the read word line signal WLR, and the OTP cell 1710 may output a first signal corresponding to the OTP key value stored in the OTP cell 1710 as the bit line signal BL and provide the first signal to the read circuit 1730. The read circuit 1730 receiving the bit line signal BL from the OTP cell 1710 may output an OTP key value OTP KEY stored in the OTP cell 1710 by comparing a reference signal Ref to the bit line signal BL.

The OTP memory may include a plurality of OTP cells and may generate encrypted data composed of a series of OTP key values by reading out OTP key values in the order of bit lines connected to each OTP cell. The OTP memory may provide the output encrypted data to an encryption module, and the encryption module may encrypt data or decrypt the encrypted data based on this.

Figure 18:
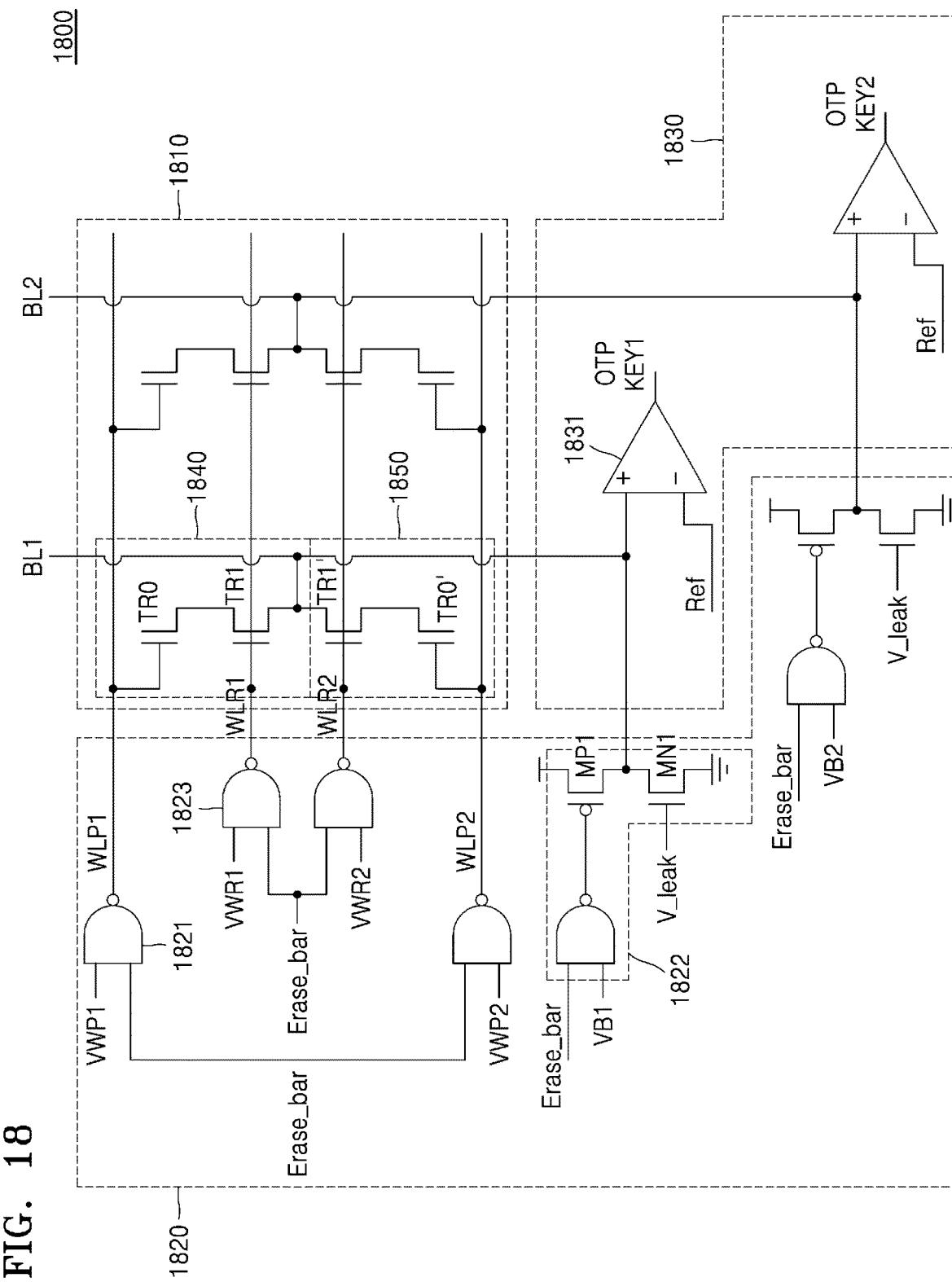
FIG. 18 is a circuit diagram illustrating an OTP memory according to an embodiment.

FIG. 18 is a circuit diagram illustrating an OTP memory according to an embodiment.

The OTP memory 1800 may include an OTP cell array 1810, a control circuit 1820, and a read circuit 1830. The control circuit 1820 according to an embodiment may program an OTP key value allocated for each OTP cell of the OTP cell array 1810 by controlling a signal input to the OTP cell array 1810 during a programming process, and may control the signal input to the OTP cell array 1810 to read the OTP key value programmed for each OTP cell during a read operation.

For convenience of explanation, an operation of inputting and outputting signals to a first OTP cell 1840 of the OTP cell array 1810 of FIG. 18 is described, but the inventive concept is not limited thereto. An identical operation is performed for each OTP cell of the OTP cell array 1810, and thus OTP key values may be programmed and read in/from a plurality of OTP cells of the OTP cell array 1810.

During the program operation, an OTP cell may store an OTP key value based on signals input to a program word line and a bit line. The control circuit 1820 may determine a program word line signal WLP1 based on a second signal VWP1 and an erase instruction signal Erase_bar. Here, the erase instruction signal Erase_bar may be received from the first node N1 of the OTP memory shown in FIGS. 5, 7, 9, 11, 13, and 15. For example, the control circuit 1820 may generate the program word line signal WLP1 by inputting the second signal VWP1 and the erase instruction signal Erase_bar to a NAND gate 1821. During the program operation, the control circuit 1820 may always receive the erase instruction signal Erase_bar of high logic level (hereinafter referred to as '1') and the program word line signal WLP1 may have a signal in which the second signal VWP1 is inverted. Accordingly, when the second signal VWP1 has a low logic level signal (hereinafter referred to as '0'), 1 may be output as the program word line signal WLP1, and when the second signal VWP1 is 1, the program word line signal WLP1 may be 0.

The control circuit 1820 may output a first bit line signal BL1 by inputting a third signal VB1, the erase instruction signal Erase_bar, and a leak signal V_leak to a bit line logic circuit 1822. For example, the control circuit 1820 may perform a negative AND operation on the third signal VB1 and the erase instruction signal Erase_bar and output the result, and may determine whether to provide the first bit line signal BL1 from a power source to the first OTP cell 1840 based on the output result. For example, because the erase instruction signal Erase_bar always has a value of 1 in the program operation, a signal in which the third signal VB1 is inverted may be input to a gate of a PMOS transistor MP1 connected to the power source. Therefore, when the third signal VB1 is 1, the PMOS transistor MP1 is turned on, and thus the first bit line signal BL1 may be 1, and when the third signal VB1 is 0, the PMOS transistor MP1 is turned off, and thus the bit line signal BL1 may be determined based on a state of an NMOS transistor MN1. The control circuit 1820, when the PMOS transistor MP1 is turned off, may input the leak signal V_leak having a high logic level to the bit line logic circuit 1822 so that the first bit line signal BL1 has 0. For example, when the erase instruction signal has 1, the bit line logic circuit 1822 may output the first bit line signal BL1 with the same value as that of the third signal VB1 by performing a function such that two inverters are connected in series.

The control circuit 1820 may output a read word line signal WLR1 based on a fourth signal VWR1 and the erase instruction signal Erase_bar. For example, the control circuit 1820 may generate the read word line signal WLR1 by inputting the fourth signal VWR1 and the erase instruction signal Erase_bar to a negative AND operation gate 1823. The read word line signal WLR1 is received at a gate of a read transistor TR1, and the control circuit 1820 may output the read word line signal WLR1 as 1 in order to connect the first bit line signal BL1 to a drain of a program transistor TR0 during a program operation. Because the operation of the read transistor of the first OTP cell 1840 has been previously described in FIG. 2, detailed descriptions will not be given herein. Because the erase instruction signal Erase_bar always has a value of 1 during the program operation, the control circuit 1820 may provide a signal in which the fourth signal VWR1 is inverted to the first OTP cell 1840 as a read word line.

A read circuit 1830 includes a differential operational amplifier (OP-AMP) circuit 1831, and may output an OTP key value OTP KEY1 of the first OTP cell 1840 by comparing the first bit line signal BL1 to a reference signal Ref. During the read operation, the control circuit 1820 may turn on the read transistor TR1 of the first OTP cell 1840 by outputting the read word line signal WLR1 of 1, and may transmit a first signal corresponding to an OTP key value stored in a program transistor TR0 to the OP-AMP 1831 of the read circuit 1830.

Figure 19:
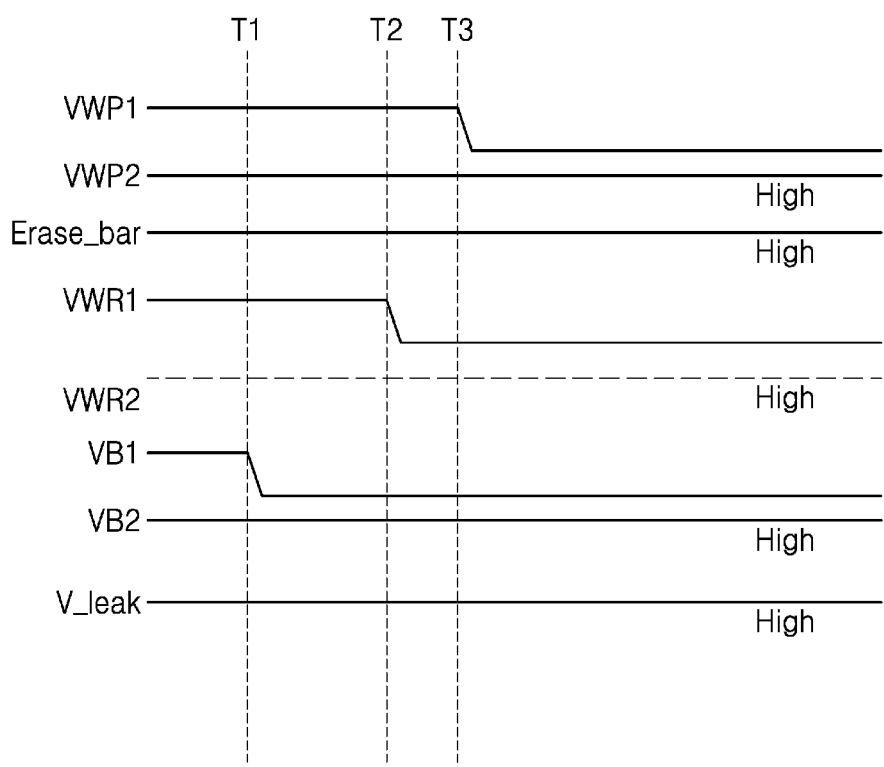
FIG. 19 is a timing diagram illustrating signals input to a control circuit of the OTP memory shown in FIG. 18 when the OTP memory performs a program operation in which an OTP key value is programmed in a first OTP cell, according to an embodiment.
Figure 20:
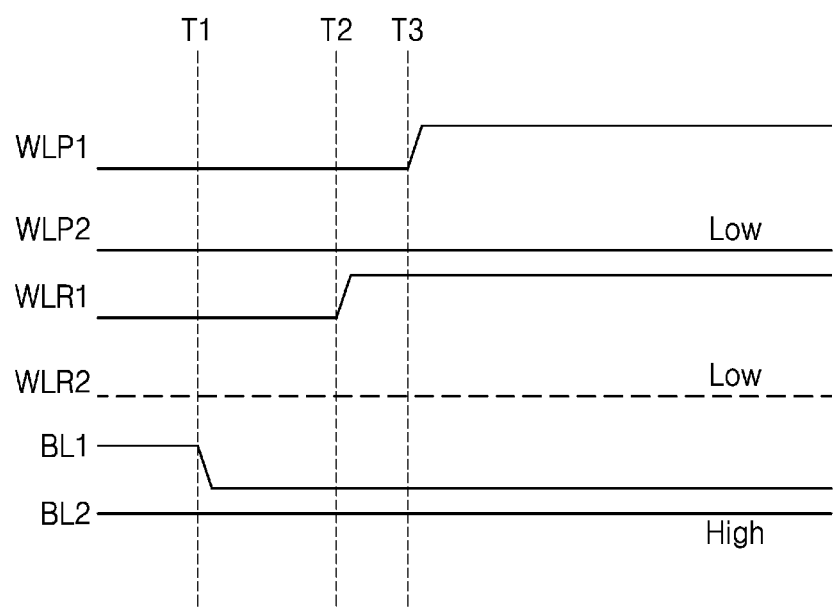
FIG. 20 is a timing diagram illustrating signals input to an OTP cell array of the OTP memory shown in FIG. 18 when the OTP memory performs the program operation, according to an embodiment.

FIG. 19 is a timing diagram illustrating signals input to a control circuit of the OTP memory shown in FIG. 18 when the OTP memory performs a program operation in which an OTP key value is programmed in a first OTP cell, according to an embodiment, and FIG. 20 is a timing diagram illustrating signals input to an OTP cell array of the OTP memory shown in FIG. 18 when the OTP memory performs the program operation, according to an embodiment.

According to FIG. 19, the control circuit 1820 may receive the third signal VB1 changed from 1 to 0 at a time T1, receive the fourth signal VWR1 changed from 1 to 0 at a time T2, receive the second signal VWP1 changed from 1 to 0 at a time T3. The signal input according to FIG. 19 is a signal input to program the first OTP cell 1840 to 1, and the order in which the second signal VWP1, the third signal VB1, and the fourth signal VWR1 are input is for illustration purposes only and is not limited thereto. During the program operation, an OTP memory may continuously receive a signal of value 1 from a power source supplying a power as an erase instruction signal Erase_bar, and may receive a signal to turn off a read transistor TR1' of a second OTP cell 1850 in order to program the first OTP cell 1840 irrespective of the second OTP cell sharing the first bit line signal BL1.

In an embodiment, each of the second signal VWP1, the third signal VB1, and the fourth signal VWR1 may be a pulse signal. For example, each of the second signal VWP1, the third signal VB1, and the fourth signal VWR1 may be changed from 0 to 1 when a certain period of time elapses after the time T3.

According to the embodiment of FIG. 20, because the third signal VB1 transitions from 1 to 0 at a time T1, the first bit line signal BL1 may also transition from 1 to 0 at the time T1. According to an embodiment, when an erase instruction signal Erase_bar input to NAND gates 1821 and 1823 which output the program word line signal WLP1 and the read word line signal WLR1 is 1, a signal in which the second signal VWP1 is inverted may be outputted as the program word line signal WLP1, and a signal in which the fourth signal VWR1 is inverted may be output as the read word line signal WLR1. Accordingly, at a time T2, the control circuit may output the read word line signal WLR1 changed from 0 to 1, and at a time T3, the control circuit may output the program word line signal WLP1 changed from 0 to 1. Therefore, after the time T3, because the program word line signal WLP1 and the read word line signal WLR1 have a value of 1 and the first bit line signal BL1 has a value of 0, the control circuit may program the first OTP cell as 1.

In an embodiment, according to each of the second signal VWP1, the third signal VB1, and the fourth signal VWR1 changed from 0 to 1 when a certain period of time elapses after the time T3, the program word line signal WLP1 may be changed from 1 to 0, the read word line signal WLR1 may be changed from 1 to 0, and the first bit line signal BL1 may be changed from 0 to 1.

Figure 21:
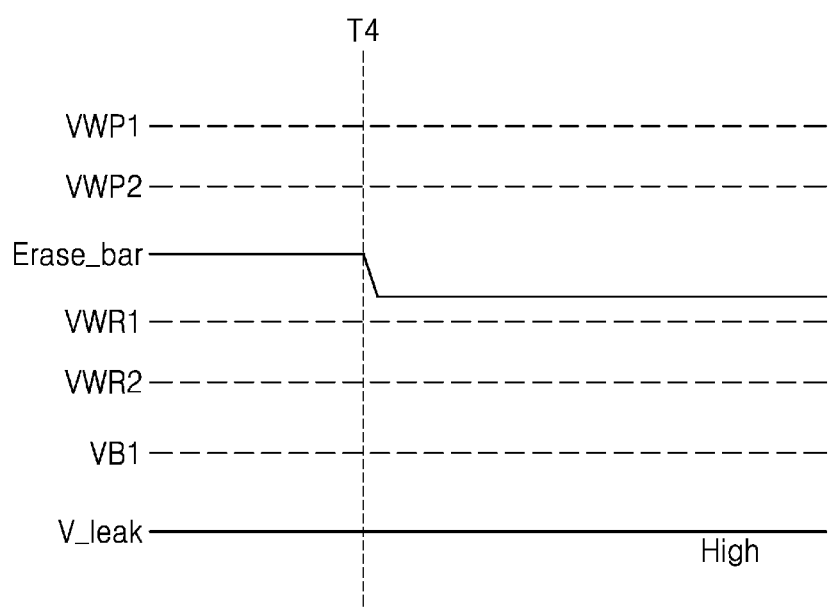
FIG. 21 is a timing diagram illustrating signals input to a control circuit of the OTP memory shown in FIG. 18 when the OTP memory performs an erase operation in which an OTP key value is erased, according to an embodiment.
Figure 22:
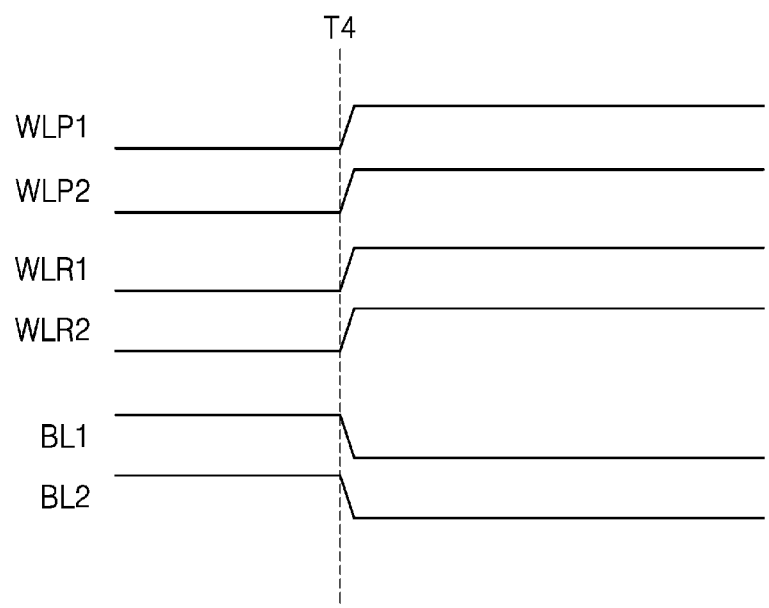
FIG. 22 is a timing diagram illustrating signals input to an OTP cell array of the OTP memory shown in FIG. 18 when the OTP memory performs an erase operation, according to an embodiment.

FIG. 21 is a timing diagram illustrating signals input to a control circuit of the OTP memory shown in FIG. 18 when the OTP memory performs an erase operation in which an OTP key value is erased, according to an embodiment, and FIG. 22 is a timing diagram illustrating signals input to an OTP cell array of the OTP memory shown in FIG. 18 when the OTP memory performs an erase operation, according to an embodiment.

When an erase instruction signal having a value of 1 is input to the control circuit, the control circuit may program a first OTP cell as described in FIGS. 19 and 20, and when second to fourth signals are not changed, an OTP key value of the first OTP cell programmed with a value of 0 or 1 may be stored.

When the control circuit detects a change in an erase instruction signal Erase_bar by mounting or removing the erase instruction circuit of a storage device at a time T4, the control circuit may output signals for programming all the OTP cells in the OTP cell array to the same value. In some examples, when the control circuit receives an erase instruction signal Erase_bar having a fixed logic level (e.g., a low logic level) by mounting or removing the erase instruction circuit of a storage device and a power is on in the storage device, the control circuit may output signals for programming all the OTP cells in the OTP cell array to the same value. Because a logic gate for outputting the program word line signal WLP1, the read word line signal WLR1, and the first bit line signal BL1 includes NAND gates and one of inputs of each of the NAND gates is the erase instruction signal Erase_bar, when the erase instruction signal Erase_bar is 0, an output value of each of the NAND gates always has 1. Thus, according to the embodiment of FIG. 18, the program word line signals WLP and the read word line signals WLR of all the OTP cells have a value of 1 and the bit line signals BL have a value of 0, and thus the control circuit may program all the OTP cells as data 1.

When an OTP cell according to an embodiment is programmed to be 1 or 0, a portion of a device included in the OTP cell is irreversibly broken, and thus may be permanently programmed to have only one specific value of 1 or 0. For example, when the OTP cell is programmed to 1, an oxide film of an anti-fuse gate is broken, so that the OTP cell has a value of 1 permanently and cannot be programmed to 0. Accordingly, when the control circuit programs all the OTP cells to 1, an OTP memory may disable OTP key values stored in the OTP memory and block access to encrypted data by an unauthorized third party.

Figure 23:
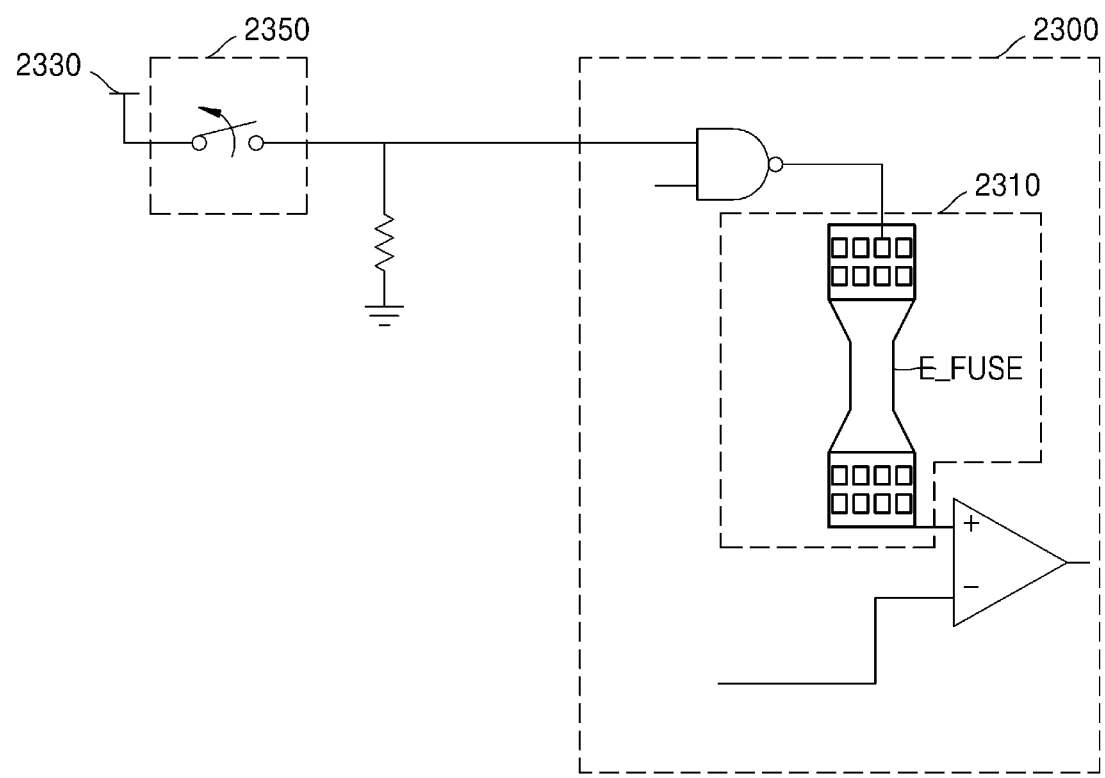
FIG. 23 is a circuit diagram of erasing an OTP key value using E-FUSE according to an embodiment.

FIG. 23 is a circuit diagram of erasing an OTP key value using E-FUSE according to an embodiment.

FIGS. 1 to 22 relate to an embodiment of storing an OTP key value in an OTP cell using an anti-fuse, and FIG. 23 relates to an embodiment of programming an OTP key value using E-FUSE. E-FUSE is a device that permanently program a specific value by causing a rapid current to flow when a high voltage is applied to opposite ends of the E-FUSE, and as a result, a current path is broken. An OTP memory 2300 may include an OTP cell array 2310 composed of a plurality of E-FUSEs and a control circuit, and the control circuit may program the same specific value in a plurality of E-FUSEs in response to detecting a change in an erase instruction signal.

The NAND gate of the control circuit may receive an erase instruction signal that is input from a power source 2330 to the OTP memory 2300 as an input. When the erase instruction signal is 1, the control circuit may determine a signal input to the OTP cell array 2310 according to value of another signal input to the NAND gate. On the other hand, when the erase instruction signal is 0, an output value of the NAND gate is always 1, and thus the control circuit may permanently program all the OTP cells to 1.

An embodiment of FIG. 23 shows a circuit diagram of programming only one OTP cell among a plurality of OTP cells. However, each of the OTP cells is connected to a NAND gate receiving the same erase instruction signal, and thus when the erase instruction signal has 0, the control circuit may program all the OTP cells to the same value.

While the inventive concept has been particularly shown and described with reference to embodiments thereof, it will be understood that various changes in form and details may be made therein without departing from the spirit and scope of the following claims.

What is claimed is:

1. A one time programmable (OTP) memory comprising:
an OTP cell array including a plurality of OTP cells and configured to store OTP data in the plurality of OTP cells arranged at intersections of a plurality of word lines and a plurality of bit lines; and
a control circuit configured to receive an erase instruction signal and erase all the OTP data by programming the plurality of OTP cells to an identical OTP data in response to the erase instruction signal having a first logic level,
wherein a first OTP cell of the plurality of OTP cells comprises:
a first transistor including a gate connected to a program word line of the plurality of word lines and configured to store a first OTP data;
a second transistor including a gate connected to a read word line of the plurality of word lines and configured to read the first OTP data; and
a first bit line of the plurality of bit lines connected to a drain of the second transistor and configured to transmit the first OTP data, and
wherein the control circuit comprises:
a first logic gate configured to receive a first signal and the erase instruction signal, and output a program word line signal to the program word line based on the first signal and the erase instruction signal; and
a second logic gate configured to receive a second signal and the erase instruction signal, and output a read word line signal to the read word line based on the second signal and the erase instruction signal.

2. The OTP memory of claim 1, wherein the control circuit is configured to erase all the OTP data when a power is on in the OTP memory.

3. The OTP memory of claim 1, wherein the control circuit is connected to an external circuit, and configured to receive the erase instruction signal at a first node through the external circuit connected to either a power source or a ground.

4. The OTP memory of claim 1, wherein the control circuit is configured to erase the first OTP cell by breaking an oxide film of the first transistor.

5. The OTP memory of claim 1, wherein the control circuit further comprises:
a bit line logic circuit configured to receive a third signal and the erase instruction signal, and determine a bit line signal of the first bit line based on the third signal and the erase instruction signal.

6. The OTP memory of claim 5, wherein the control circuit is configured to program the plurality of OTP cells to an identical data regardless of the first to third signals in response to the erase instruction signal having the first logic level.

7. The OTP memory of claim 5, further comprising:
a read circuit configured to compare the bit line signal to a reference signal, and output the first OTP data based on a result of the comparison.

8. A storage device comprising:
a one time programmable (OTP) memory including a plurality of OTP cells and configured to store OTP data in the plurality of OTP cells; and
a controller configured to encrypt data stored in the storage device by using the OTP data,
wherein when the storage device includes an erase instruction circuit connected to the OTP memory, the OTP memory is configured to receive an erase instruction signal having a first logic level through the erase instruction circuit and program a target OTP cell of the plurality of OTP cells to an OTP data in response to the erase instruction signal having the first logic level, and
wherein when the storage device does not include the erase instruction circuit, the OTP memory is configured to receive the erase instruction signal having a second logic level opposite the first logic level and permanently erase all the OTP data stored in the plurality of OTP cells by programming the plurality of OTP cells to an identical OTP data in response to the erase instruction signal having the second logic level.

9. The storage device of claim 8, wherein a first OTP cell of the plurality of OTP cells comprises:
a first transistor including a gate connected to a program word line and configured to store a first OTP data;
a second transistor including a gate connected to a read word line and configured to read the first OTP data; and
a bit line connected to a drain of the second transistor and configured to transmit the first OTP data.

10. The storage device of claim 9, wherein the OTP memory includes a control circuit comprising:
a first logic gate configured to receive a first signal and the erase instruction signal, and output a program word line signal to the program word line based on the first signal and the erase instruction signal;
a second logic gate configured to receive a second signal and the erase instruction signal, and output a read word line signal to the read word line based on the second signal and the erase instruction signal; and
a bit line logic circuit configured to receive a third signal and the erase instruction signal, and determine a bit line signal of the bit line based on the third signal and the erase instruction signal.

11. The storage device of claim 8, wherein the erase instruction circuit comprises:
a switch connected between a power source and a first node of the OTP memory.

12. The storage device of claim 11, further comprising:
a resistor connected between the first node of the OTP memory and a ground,
wherein when the storage device does not include the erase instruction circuit, the erase instruction signal of the first node has the second logic level by the ground.

13. The storage device of claim 8, wherein the OTP memory is configured to erase all the OTP data when the storage device does not include the erase instruction circuit and a power is on in the storage device.

14. The storage device of claim 8, further comprising:
an erase status display circuit including a transistor configured to turn on or turn off in response to the erase instruction signal, and a fuse connected between a drain of the transistor and a ground,
wherein the transistor is turned on and the fuse is blown when the erase instruction signal has the second logic level.

15. A storage device comprising:
a one time programmable (OTP) memory including a plurality of OTP cells and configured to store OTP data in the plurality of OTP cells; and
a nonvolatile memory configured to store data encrypted by using the OTP data,
wherein when the storage device includes an erase instruction circuit connected to the OTP memory, the OTP memory is configured to receive an erase instruction signal through the erase instruction circuit and permanently erase all the OTP data by programming the plurality of OTP cells to an identical OTP data in response to the erase instruction signal having a first logic level, and wherein when the storage device does not include the erase instruction circuit, the OTP memory is configured to receive the erase instruction signal having a second logic level opposite the first logic level and program a target OTP cell of the plurality of OTP cells to an OTP data in response to the erase instruction signal having the second logic level.

16. The storage device of claim 15, further comprising:

an encryption module configured to receive the OTP data and generate media encryption keys based on information extracted by decrypting the OTP data, wherein the nonvolatile memory is configured to store data encrypted by using the media encryption keys.

17. The storage device of claim 15, further comprising:

a resistor connected between a power source and a first node of the OTP memory, wherein when the storage device includes the erase instruction circuit, the erase instruction circuit comprises a switch connected between a ground and the first node of the OTP memory, and wherein when the storage device does not include the erase instruction circuit, the erase instruction signal of the first node has the second logic level by the power source.

18. The storage device of claim 15, wherein the OTP memory is configured to erase all the OTP data in the plurality of OTP cells when the storage device includes the erase instruction circuit and a power is on in the storage device.

* * * * *